United States Patent
Smith et al.

(10) Patent No.: US 11,260,294 B2
(45) Date of Patent: Mar. 1, 2022

(54) VIRTUAL CONTROLLER FOR GAME INJECTION

(71) Applicant: Microsoft Technology Licensing, LLC, Redmond, WA (US)

(72) Inventors: Gregory M. Smith, Seattle, WA (US); Heather Grantham Brodie, Redmond, WA (US); Chad Gibson, Seattle, WA (US); Jonathan J. Caruana, Woodinville, WA (US); Hamze M. Kalache, Bellevue, WA (US); Gersh Payzer, Seattle, WA (US); Samantha E. Vim, Issaquah, WA (US); Christopher M. McAllen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 15/608,777

(22) Filed: May 30, 2017

(65) Prior Publication Data

US 2018/0345139 A1 Dec. 6, 2018

(51) Int. Cl.
*A63F 13/323* (2014.01)
*A63F 13/355* (2014.01)
(Continued)

(52) U.S. Cl.
CPC .......... *A63F 13/323* (2014.09); *A63F 13/23* (2014.09); *A63F 13/335* (2014.09);
(Continued)

(58) Field of Classification Search
CPC ....... A63F 13/323; A63F 13/335; H04L 67/38
See application file for complete search history.

(56) References Cited

U.S. PATENT DOCUMENTS

| 7,458,894 B2 | 12/2008 | Danieli et al. |
| 2010/0100359 A1 | 4/2010 | Podoloff et al. |

(Continued)

FOREIGN PATENT DOCUMENTS

| CN | 101127875 A | 2/2008 |
| EP | 2311539 A2 | 4/2011 |

(Continued)

OTHER PUBLICATIONS

Couture, Joel, "Designing games that let livestream viewers take part in the play", http://www.gamasutra.com/view/news/262222/Designing_games_that_let_livestream_viewers_take_part_in_the_play.php, Published on Dec. 30, 2015, 4 pages.

(Continued)

*Primary Examiner* — Yingchuan Zhang
(74) *Attorney, Agent, or Firm* — Holzer Patel Drennan (57) ABSTRACT

A computing system includes an input driver and a virtual input controller. The input driver is configured to receive input data from a first controller of a recognized data protocol and to provide the input data to an API of an application to control actions of a first participant in the gaming application. The virtual input controller is, in contrast, configured to receive input data from a second controller of a protocol incompatible with the input driver, translate the input data to the recognized data protocol; request a broadcast application identifier for a currently-broadcasting application from the broadcasting agent, and provide the translated input data to the input driver in association with the broadcast application identifier for controlling actions of a second participant in the application via the API of the gaming application.

20 Claims, 4 Drawing Sheets

(51) Int. Cl.
*A63F 13/48* (2014.01)
*A63F 13/86* (2014.01)
*A63F 13/23* (2014.01)
*A63F 13/335* (2014.01)
*H04L 29/06* (2006.01)
*H04L 67/131* (2022.01)
*G06F 3/06* (2006.01)

(52) U.S. Cl.
CPC ............ *A63F 13/355* (2014.09); *A63F 13/48* (2014.09); *A63F 13/86* (2014.09); *H04L 67/38* (2013.01); *A63F 2300/407* (2013.01); *G06F 2003/0697* (2013.01)

(56) References Cited

U.S. PATENT DOCUMENTS

| | | |
|---|---|---|
| 2010/0166064 A1 | 7/2010 | Perlman et al. |
| 2011/0136568 A1 | 6/2011 | Buhr |
| 2012/0079080 A1* | 3/2012 | Pishevar ................. A63F 13/12 709/220 |
| 2013/0123019 A1 | 5/2013 | Sullivan et al. |
| 2014/0007086 A1* | 1/2014 | Ross ....................... H04L 67/38 718/1 |
| 2014/0125590 A1 | 5/2014 | Flagg et al. |
| 2015/0052540 A1 | 2/2015 | Kim |
| 2015/0121437 A1 | 4/2015 | Tan |
| 2015/0315101 A1 | 11/2015 | Lapinski et al. |
| 2017/0003740 A1 | 1/2017 | Verfaillie et al. |
| 2018/0001216 A1* | 1/2018 | Bruzzo .................. A63F 13/25 |

FOREIGN PATENT DOCUMENTS

| | | |
|---|---|---|
| EP | 3064256 A1 | 9/2016 |
| WO | 2014124544 A1 | 8/2014 |

OTHER PUBLICATIONS

Westlake, Adam, "Twitch Debuts Choice Chamber, First Game Encouraging Viewer Interaction", https://www.slashgear.com/twitch-debuts-choice-chamber-first-game-encouraging-viewer-interaction-17393389/, Published on Jul. 17, 2015, 4 pages.

Wang, et al., "Anatomy of a Personalized Livestreaming System", In Proceedings of the Internet Measurement Conference, Nov. 14, 2016, 14 pages.

"International Search Report and Written Opinion Issued in PCT/US18/029673", dated Jul. 5, 2018, 17 Pages.

* cited by examiner

VIRTUAL CONTROLLER FOR GAME INJECTION

BACKGROUND

The continued evolution and growth of online gaming has led to development of gaming environments that allow geographically remote players to interact together in same online world by broadcasting information to one another. Some gamers may also utilize features of a spectating system that allow spectators to watch broadcast streams of game play without actively participating. For example, a spectating system may deliver live or recorded streams of game play to various gamers by way of an internet connection, allowing spectators to watch one or more player or teams of players participating in a multiplayer online game without having to purchase or otherwise utilize a gaming console to view the game play.

SUMMARY

According to one implementation, a computing system includes at least a broadcasting agent, an input driver, and a virtual input controller. The broadcasting agent is executable to broadcast a data stream of an application to a spectating device; the input driver is executable to convey user inputs to an application programming interface (API) of the application; and the virtual input controller is executable to translate state data received from the spectating device from a protocol incompatible with the game input driver to a protocol compatible with the game input driver, request a broadcast application identifier for a currently-broadcasting application from the broadcasting agent, and provide the translated state data to the input driver in association with the broadcast application identifier for affecting control actions to content within the broadcast data stream.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein disclosed technology generally facilitates remote player participation in an application executing on a computing device by virtually injecting the application with inputs pre-formatted to mimic inputs from a controller that is compatible with the computing device, such as a locally-present accessory (e.g., a keyboard or handheld game controller). As a result, a spectator viewing a broadcast stream of the application may be able to use an internet connection to actively participate in the application without having to purchase or locally execute a copy of the application, and inputs from the spectator are seamlessly received such that the application does not have to perform any 'work' to integrate or process these inputs from the spectator. In one implementation, the computing device identifies which currently-executing application is generating the broadcast stream and provides the inputs from the spectator exclusively to the identified application. As a result, the computing device is protected from malicious parties seeking to hack into and/or misappropriate data of other currently-executing applications on the gaming device.

As used herein, "remote participation" refers game participation by a user who is providing inputs to an application across a wide area network, such as a cellular or Broadband internet network, and without locally executing a copy of the application.

Figure 1:
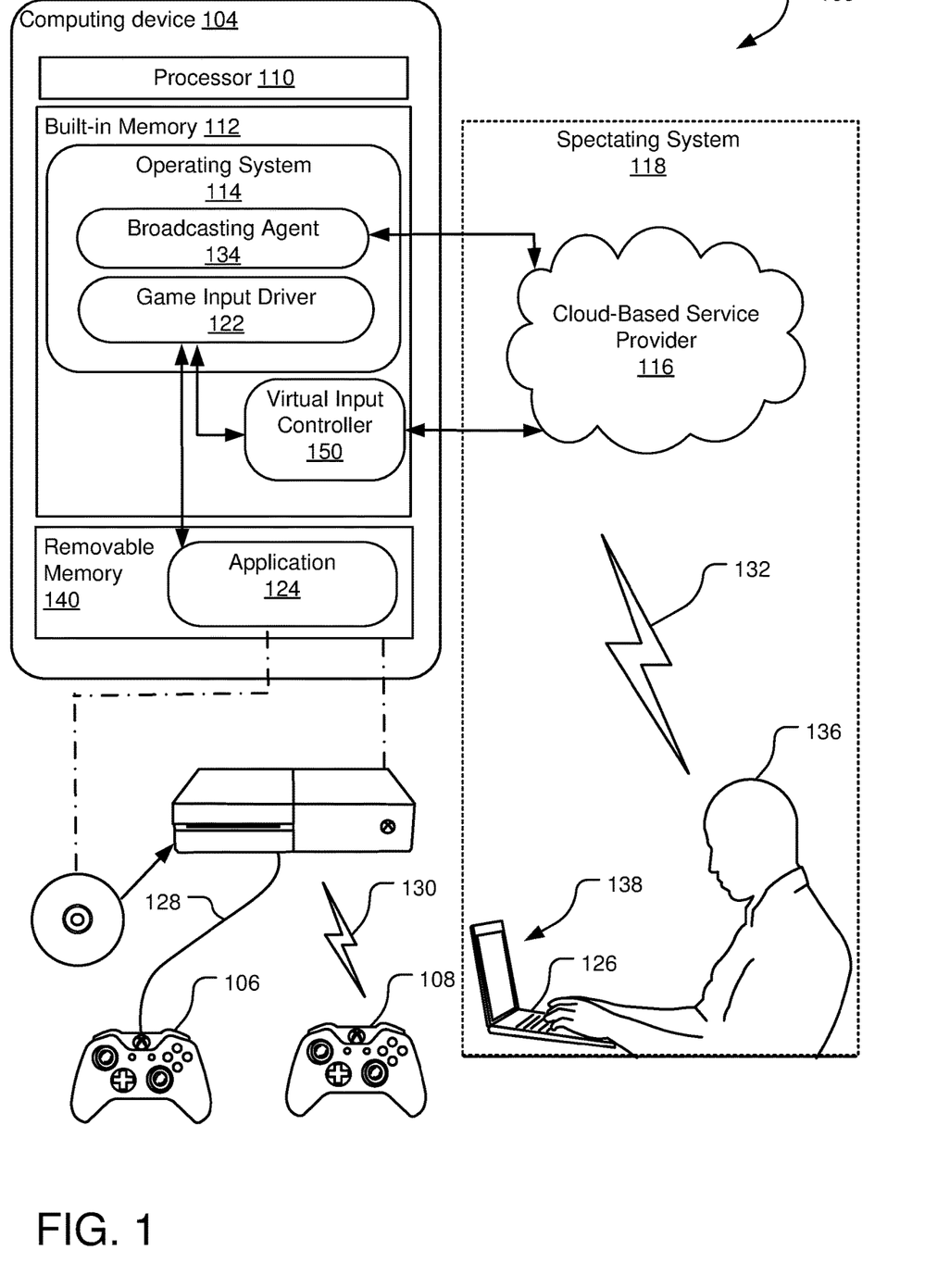
FIG. 1 illustrates an example system for virtual input injection to that allows a device incompatible with an input driver to provide inputs to the input driver.

FIG. 1 illustrates an example system for virtual controller injection 100 that includes a computing device 104 (e.g., a game console or personal computer) configured to locally execute an application 124 and receive user input from one or more controllers 106, 108, 126 to affect actions of the application. In the event that the application 124 is a gaming application, the controllers 106, 108, and 126 are usable to affect gaming actions within the application 124. As used herein, the term "controller" is used to refer to any user input device for which a gaming system is adapted to receive inputs for injection into a locally-executing application. Controllers may, for example, include handheld controllers (gamepads), joysticks, touchpads, keypads, etc.

In one implementation, controllers capable of communicating with the computing device 104 share a configuration commonality, such as being compatible with an operating system 114 of the computing device 104. In one implementation, each of the controllers 106, 108, and 126 are compatible with a same operating system that identifies and loads drivers based on information initially communicated from each of the controllers 106, 108, and 126.

Some of the controllers (gamepads, such as the controllers 106 and 108) may be further designed for compatibility with specific drivers of the operating system 114 tasked with providing input to the application 124. For example, the controllers 106 and 108 may be gamepads adapted to transmit user inputs according to a data protocol (e.g., a packet format) that is recognized by the various game drivers that load and execute the application 124. Other controllers in the system for virtual controller injection 100 may not be compatible with drivers used to load and execute the application 124. For example, the controller 126 is a keyboard of a spectating device 138 located at a remote location relative to the computing device 104 and includes software that is compatible with the operating system 114 but not compatible with the various drivers that provide input directly to the application 124.

As used herein, two software components are "compatible" with one another if they are configured to bi-directionally communicate according to a common data protocol. Example data protocols include without limitation Universal Serial Bus (USB), Bluetooth, Game Input Protocol or "GIP," which is used for communications between Xbox controllers and gaming system drivers, Human interface device (HID), etc. In FIG. 1, the controller 126 and/or the spectating device 138 are compatible with the operating system 114 but not compatible with a input driver 122 that functions to provide user inputs to an application programming interface (API) of the application 124. In contrast, the controllers 106 and 108 are compatible with both the operating system 114 and the input driver 122.

As discussed in greater detail below, the herein disclosed technology facilitates bidirectional communications between certain incompatible devices and/or applications to allow virtual controller input (e.g., remotely-provided user input from a non-compatible controller) to be injected into a gaming application, such as into the application 124.

Among other components, the computing device 104 includes at least a processor 110 and built-in memory 112 for storing the operating system 114 and one or more applications, such as a virtual input controller 150. The operating system 114 further includes a number of drivers and controllers that serve various functions in loading or executing applications and various functions in facilitating bidirectional data flows between the application(s) and the controllers 106, 108, 126. In addition to the built-in memory 112, the computing device 104 may further include removable memory 140, such as a disk drive for receiving a disk or a port for receiving a flash device. For example, the application 124 may be stored on a removable disk.

The input driver 122 manages data flows to and from various controllers that are compatible with the input driver 122 (also referred to herein as "driver-compatible controllers"). For example, the input driver 122 may receive input state data from the controllers 106 and 108 that is of a recognized data protocol (e.g., packet format). Because the data protocol is recognized, the input driver 122 can process data from the controllers 106 and 108 and provide corresponding inputs to the API of the application 124 to affect control actions, such as gaming actions, that effectuate changes in broadcast content of the application that is presented to at least one user (e.g., a spectator 136). As used herein, a "broadcast application data stream" refers to data generated by an application that is transmitted over a network for presentation and that includes visually-represented data based on control actions performed by one or more users. A "game play stream" refers to a broadcast application data stream that is generated by a gaming application. "Gaming actions" refers to changes to content presented in a game play stream including, for example, actions taken by or otherwise affecting avatars controlled by different controllers.

At least one of the controllers in the system for virtual controller injection 100 is not compatible with the various drivers tasked with providing inputs to the application 124. For example, the controller 126 is not compatible with the input driver 122. However, inputs provided to the controller 126 may be seamlessly passed to the input driver 122 on account of actions performed by the virtual input controller 150 and/or a spectating system 118, as discussed below.

In FIG. 1, the virtual input controller 150 is shown in the built-in memory 112 and configured for bidirectional communication with aspects of the operating system 114, such as the input driver 122. In other implementations, some or all functionality of the virtual input controller 150 is performed by software and/or hardware components external to the computing device 104, such as by another device that communicates with the computing device 104 over the internet.

In different implementations, the controllers 106, 108, and 126 may take on a variety of forms including without limitation wired and wireless devices, such as handheld gaming controllers, gamepads, joysticks, touchpads, keyboards, etc. In some implementations, one or more of the controllers 106, 108, or 126 physically couple to the computing device 104, such as via a physical port on the front of the console. For example, the computing device 104 may have a number of physical ports for coupling to various wired controllers. In addition, or in lieu of physical ports, the computing device 104 may be adapted to dynamically assign virtual controller slots to wireless controllers compatible with the input driver 122. In FIG. 1, the controller 106 is coupled to the computing device 104 via a wired interface 128, while the controller 108 is a handheld gamepad coupled to the computing device 104 via a wireless interface 130. The controller 126 is, in contrast, a personal computer that communicates with the computing device 104 through a wide area network 132, such as a cellular or Broadband network.

In addition to those components described above, the computing device 104 further includes a broadcasting agent 134 that utilizes communication circuitry (not shown) of the computing device 104 to transmit a data stream generated by the application 124 across a network, such as across a Broadband internet or cellular connection, to a spectating system 118.

In one implementation, the spectating system 118 includes a cloud-based service provider 116, such as a network-based video streaming system or service that supports live streaming of broadcasts from various devices with broadcasting capability. The spectating system 118 may support live broadcasts for multiple different game consoles and/or other game-execution devices to tens, hundreds, or thousands of spectating devices, such as a spectating device 138 that is wired or wireless coupled to the controller 126 (e.g., a keypad). In implementations where the application 124 is a gaming application, the transmitted data stream may be a stream of live or prerecorded game play including audio and/or video data. In implementations where the application 124 is not a gaming application, the broadcast data stream may include other information for presentation on one or more spectating devices such as the spectating device 138. For example, the application 124 may be an art application that allows different artists to collaborate on a same project.

As used herein, the term "spectating device" is used to refer to a device that presents a live or recorded application broadcast (e.g., a game play broadcast) to a user (also referred to herein as a "spectator"). For example, a spectator 136 may interact with a user interface of the cloud-based service provider 116 to select and play back recordings received from various broadcast devices, such as a game play stream broadcast by the computing device 104. In one implementation, the spectating device 138 includes a display for presenting a game play broadcast and also includes one or more input devices that may serve as a game controller, such as a keypad, touch pad, joystick, or any other input device.

Some existing spectating systems facilitate collection of game inputs from a spectator viewing a game play broadcast and provisioning of such inputs (also referred to herein as "spectator inputs") to a corresponding broadcast device for injection to a currently-executing gaming application. If the gaming application is itself adapted to receive and understand spectator inputs, the spectator inputs may be handled directly by the gaming application such that the gaming application does the work to interpret and process such inputs to affect game play actions in some way. Traditionally, this functionality is limited to those gaming applications that developers have specially adapted for receiving spectator inputs.

In contrast, the presently-disclosed technology facilitates an ongoing and seamless receipt and injection of spectator inputs into an application executing on the computing device 104, regardless of whether the application is adapted to receive spectator inputs and without requiring that the game or application do work to receive, format, and/or interpret the spectator inputs. For example, the disclosed technology may permit the application 124 to receive inputs that originate at the controller 126, which is not able to communicate according to a data protocol recognized by the input driver 122. The application 124 receives these inputs according to the data protocol recognized by the input driver 122, as if the inputs were initially transmitted by a locally-present controller, such as the controllers 106 and 108.

The virtual input controller 150 performs actions to communicate with the cloud-based service provider 116 to receive information from and send information to a spectator 136 the spectating system 118. Responsive to receipt of information from the spectating system 118, the virtual input controller 150 communicates with the input driver 122 to "fake" receipt of input from a driver-compatible controller, such as a handheld gamepad that is wired or wirelessly connected to the computing device 104. Moreover, the virtual input controller 150 also performs actions to protect the computing device 104 by channeling inputs from the spectating system 118 exclusively to a currently-broadcasting application (e.g., the application 124), such that any malicious inputs received through the spectating system 118 are not received by any other currently-executing applications on the computing device 104.

Among many operations performed to establish bidirectional communication between the spectating device 128 and the application 124, the virtual input controller 150 translates incoming data from the spectating device 128 to a protocol recognized by the input driver 122 and provides the translated data to the input driver 122 along with an instruction to inject the translated inputs to a specific application that is currently generating a broadcast from the computing device. This instruction is critical in protecting the computing device 104 from malicious hacking attempts initiated by the spectator 136. In the absence of an instruction to provide inputs to an API to a specific, currently-broadcasting application, the input driver 122 may inject received inputs to whichever executing application is currently "in-focus." In many cases, the application 124 is the in-focus application. If, however, a user of the computing device 102 momentarily switches between a window of the application 124 and a window of a second application previously-executing in the background, the second application may momentarily become the "in-focus" application. Thus, there exists the possibility that inputs from the spectating system 118 may, at times, be made available to one or more applications that is not the application 124. In the absence of security actions taken by the virtual input controller 150 (e.g., described below), a hacker may exploit this vulnerability and direct malware into certain non-broadcasting applications of the computing device 104.

To protect the computing device 104 from malicious inputs sent from the spectating system 118, the virtual input controller 150 queries the broadcasting agent 134 prior to injecting the inputs to the input driver 122. During this query, the virtual input controller 150 requests a broadcast application identifier that identifies the specific application that is generating the data stream (e.g., a game play stream or other application broadcast) currently being broadcast from the computing device 104 to the spectating system 118. The broadcasting agent 134 provides this broadcast application identifier, and the virtual input controller 150 instructs the input driver 122 to inject the translated inputs from the spectating system 118 to an API of the identified currently-broadcasting application (e.g., the application 124).

The input driver 122 accepts and processes the translated inputs as if they were from a driver-compatible controller and, in turn, injects the inputs to an API of the application 124. Consequently, the inputs affect gaming actions of the application 124 executing on the computing device 104 even if the application 124 does not itself include code to handle and interpret such inputs from the spectating device 138 and/or the spectating system 118. Further example details of such a process are described below with respect to FIGS. 2 and 3.

The disclosed functionality may be used in a variety of ways. In one implementation, the disclosed technology allows a spectator (e.g., the spectator 136) viewing a stream of live game play to "jump in" and join the game and/or take over for an existing player without having to obtain a physical copy of the game to execute on and/or broadcast from a local processing device. This may, for example, allow a user to "try out" a game he or she is thinking about purchasing through a basic internet connection, even if the game itself does not include any software especially adapted to receive and interpret inputs from computing devices that are not compatible with the gaming system environment.

In other implementations, the disclosed technology allows a spectator viewing a broadcast stream of game play to provide various types of input to a gaming application while viewing a live or prerecorded broadcast of the game or application. For example, a spectating individual may provide inputs to solve a puzzle or to "take over" controls of a player for a portion of the game, such as to assist a player through a difficult part of a game.

Figure 2:
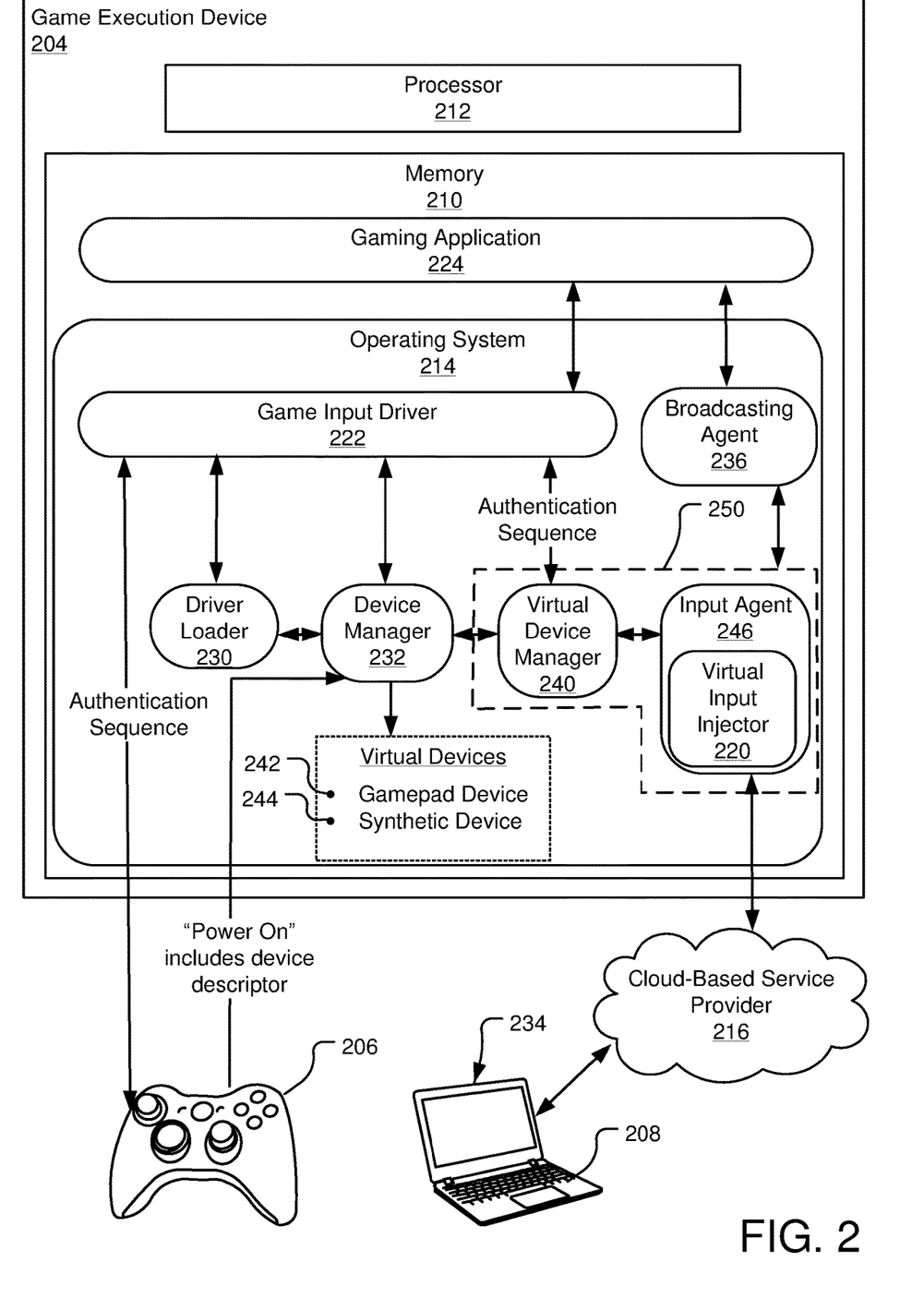
FIG. 2 illustrates example actions for game controller authentication within an example system for virtual input injection.

FIG. 2 illustrates actions for controller authentication within an example system for virtual input injection 200. The system for virtual input injection 200 includes a game execution device 204 (e.g., a game console or personal computer adapted to locally execute a gaming application 224) and a cloud-based service provider 216 that streams a game play broadcast from the game execution device 204 to one or more spectating devices (e.g., a spectating device 234). For example, the cloud-based service provider 216 may be a media-streaming service that allows spectators to select and view live and prerecorded game play streams, such as a Beam (an interactive livestreaming platform for Xbox One).

The system for virtual input injection 200 facilitates multi-player participation in the gaming application 224, including participation by one or more users that interact with the gaming application 224 over an internet connection through the cloud-based service provider 216. For example, a first user may participate in game play of the gaming application 224 using a driver-compatible game controller 206 while a second user may participate in the same game play (e.g., as a second player) using a driver-incompatible game controller 208 (e.g., a keyboard of a spectating device 234) that communicates with the game execution device 204 through the cloud-based service provider 216.

The game execution device 204 includes a processor 212 and memory 210, which may include built-in memory and/or removable memory. The memory 210 stores an operating system 214 further including various drivers, such as a game input driver 222, and modules (e.g., a driver loader 230 and a device manager 232) that perform different tasks in initializing and maintaining communications between the operating system 214 and various game controllers, such as the driver-compatible game controller 206 and the driver-incompatible game controller 208. In addition, the memory 210 stores a gaming application 224.

In general, the driver-compatible game controller 206 is a controller configured to transmit data packets according to a first protocol recognized by the game input driver 222. The driver-incompatible game controller 208 is, in contrast, configured to transmit data packets according to a second protocol that is not recognized by the game input driver 222. When a user presses a power button on the driver-compatible game controller 206, the driver-compatible game controller 206 transmits a "power on" signal to the game execution device 204. This signal includes data packets of the first protocol (e.g., the driver-compatible protocol). In some implementations, the "power-on" signal further includes a device descriptor identifying a device classification of the driver-compatible game controller 206. The device descriptor is, for example, a descriptor identifying a type of controller (e.g., a gamepad, a joystick, a keypad, touchpad, etc.) that is recognized by the game input driver 222 as being a driver-compatible device.

In one implementation, the device manager 232 of the operating system 214 creates a virtual device 242 in the memory 210 responsive to receipt of the power on signal from the driver-compatible game controller 206. The virtual device 242 is associated with the received device descriptor. For example, the device manager 232 creates the virtual device 242 (e.g., "gamepad device"), which is saved in association with a device descriptor identifying the virtual device 242 as a gamepad.

After initial creation of the virtual device 242 corresponding to the driver-compatible game controller 206, the driver loader 230 of the operating system 214 uses the virtual device 242 to identify and load applicable drivers for receiving and processing inputs from the driver-compatible game controller 206. In one implementation, the driver loader 230 uses the device descriptor of the virtual device 242 to identify the game input driver 222 and/or one or more specific mini drivers (not shown) of the game input driver 222 as the applicable drivers for receiving and processing inputs from the driver-compatible game controller 206. For example, the driver loader 230 may access an INF file that lists different device descriptors (e.g., gamepad, joystick, touchpad, remote, racing wheel, etc.) in association with corresponding mini drivers for loading and processing inputs from each type of device identified by the device descriptor.

After the driver loader 230 selects and loads the game input driver 222 and/or the associated appropriate mini drivers for the identified device descriptor, the game input driver 222 stands by for an authentication or "handshake" sequence that is initiated by the driver-compatible game controller 206 to make the virtual device 242 available to the game input driver 222. For example, the driver-compatible game controller 206 may transmit a "hello" message that includes a unique device identifier, such as a serial number for the driver-compatible game controller 206. The game input driver 222 responds to the "hello" with a request for data, such as with a request for certain metadata from the driver-compatible game controller 206. In response, the driver-compatible game controller 206 transmits the requested data.

At the conclusion of the authentication sequence, the virtual device 242 is made available (e.g., created) within the game input driver 222 and propagated throughout the operating system 214, such that the virtual device 242, corresponding device capabilities, and other data (e.g., future incoming state data) are then available to various entities of the operating system 214 and/or processes of the gaming application 224 that subscribe to such information. As a result, bidirectional communication is established between the game input driver 222 and the driver-compatible game controller 206, and the game input driver 222 may then begin receiving state data from the driver-compatible game controller 206 and providing this information to various processes of the gaming application 224 registered for input from the game input driver 222. For example, the game input driver 222 provides state data describing user input (e.g., buttons presses, keypad input) to an API of the gaming application 224 for injection into and affecting control actions in an executing game.

A broadcasting system (not shown) of the game execution device 204 may broadcast a live audio and/or video stream of the gameplay on the game execution device 204 to the cloud-based service provider 216, which in turn makes such content available to one or more spectators for selection and viewing on a spectating device, such as the spectating device 234 (e.g., a personal computer). Although the spectating device 234 is, in some implementations, compatible with the operating system 214, the spectating device 234 is not compatible with the game input driver 222.

In one implementation, the cloud-based service provider 216 provides a spectator with an option to actively participate in game play broadcast from the game execution device 204. For example, the cloud-based service provider 216 may present a graphical user interface (GUI) on the spectating device 234 that provides a spectator with the option to join game play of a live broadcast from the game execution device 204. As used herein, joining or participating in game play means, for example, providing inputs that may effectuate game actions in a game broadcast. For example, the spectator may provide inputs to the spectating device 234 that control actions of a player in the gaming application 224, such as actions of a newly-added avatar or actions that control an avatar of an existing player (e.g., by taking over control actions of the existing player). When the user selects this option to join the game play, the cloud-based service provider 216 transmits a request for remote player participation to the game execution device 204. A virtual input controller 250 of the operating system 214 receives and processes this request by performing actions that permit the game input driver 222 to receive and process inputs from the spectating device 234 as if those inputs were from a driver-compatible game controller, such as the driver-compatible game controller 206.

The virtual input controller 250 includes various modules that perform different functions, including an input agent 246, a virtual input injector 220, and a virtual device manager 240. The input agent 246 initially receives a remote player participation request from the cloud-based service provider 216. For example, the remote player participation request may be initially sent from the spectating device 234 via selection of an option from a user interface of the cloud-based service provider 216.

Upon receipt of the request for remote player participation, the input agent 246 communicates this request to the virtual device manager 240 which, in turn, transmits a "device create" command to the device manager 232. This "device create" is effective to cause the device manager 232 to create a virtual device 244 (e.g., "synthetic device") in memory that is associated with a specific device descriptor recognized as compatible with the game input driver 222. The virtual device 244 can then be used to load applicable drivers that facilitate communication between the operating system 214 and the type of physical device specified by the device descriptor. For example, the virtual device manager 240 instructs the device manager 232 to create a virtual device of a driver-compatible type identified by a device descriptor "software device." The resulting virtual device 244 is herein referred to as a "synthetic device" since it does not actually correspond to a physical device that is compatible with the game input driver 222.

Responsive to creation of the virtual device 244, the driver loader 230 loads drivers associated with the device descriptor of the virtual device 244. For example, the driver loader 230 loads various mini drivers of the game input driver 222 that facilitate bidirectional data communications with a type of device identified by the device descriptor (e.g., "software device") of the virtual device 244.

After the driver loader 230 selects and loads the appropriate drivers for the virtual device 244, the virtual device manager 240 of the virtual input controller 250 requests information usable to "fake" an authentication or handshake sequence similar to the above-described authentication sequence performed to establish bidirectional communications between the driver-compatible game controller 206 and the game input driver 222. In one implementation, the virtual device manager 240 asks the game input driver 222 for a unique device identifier (e.g., a device identifier currently not in use by the game input driver 222). The game input driver 222 of the operating system 214 generates and provides the virtual device manager 240 with a unique device identifier that is guaranteed to be different from other various identifiers associated with other currently-active game controllers in the system for virtual input injection 200.

In addition to the actions described above, the virtual device manager 240 also queries a broadcasting agent 236 to retrieve a process ID specifically identifying an application that is currently broadcasting from the game execution device 204. In one implementation, the broadcasting agent 236 uses this process ID when initiating a new broadcast from the game execution device 204. For example, the broadcasting agent 236 may routinely check that a process ID for a current "in-focus" application is an application of a gaming type before initiating a requested broadcast.

In one such implementation, the broadcasting agent 236 maintains a variable corresponding to the process ID for a currently "in-focus" application (e.g., the application that a user is currently interacting with). Each time the in-focus application changes, the broadcasting agent 236 updates this variable to reflect a new process ID corresponding to the new in-focus application.

As a result of the above-described operations, the broadcasting agent 236 is able to provide the virtual device manager 240 with the process ID of the currently-broadcasting application. This process ID is hereinafter referred to as a broadcast application identifier.

After receiving a unique device identifier from the game input driver 222 and the broadcast application identifier from the broadcasting agent 236, the virtual device manager 240 initiates the authentication or "handshake" sequence with the game input driver 222, such as by sending a "hello" command to the game input driver 222 including the retrieved unique device identifier. The game input driver 222 responds to the "hello," and may then request other information about the virtual device 244, which the virtual device manager 240, in turn, provides. The virtual device manager 240 also provides the game input driver 222 with the broadcast application identifier from the broadcasting agent 236 to identify the gaming application 224 as an exclusive target application for inputs associated with the virtual device 244. For example, the virtual device manager 240 may provide a target application instruction specifying the broadcast application identifier received from the broadcasting agent 236. In some implementations, the virtual device manager 240 provides the game inputs driver 222 with the target application instruction at a time that is separate from the authentication sequence, such as prior to initiation of the authentication sequence or following the conclusion of the authentication sequence.

The virtual device 244 (synthetic device) is made available (e.g., created) within the game input driver 222 after successful completion of the authentication sequence. At this time, the virtual device 244 is propagated throughout the operating system 214, making the virtual device 244, corresponding device capabilities, and other data (e.g., future incoming state data) available to the application that is currently broadcasting (e.g., the gaming application 224).

In addition to using the retrieved unique identifier to make the virtual device 244 available to the game input driver 222 (as described above), the virtual device manager 240 also uses the retrieved unique identifier to create a handle to the virtual device 244 within the input agent 246. In FIG. 2, this handle is shown as virtual input injector 220. The input agent 246 uses this handle to flow information between the virtual device 244 and the cloud-based service provider 216.

After the creation of the virtual input injector 220, the input agent 246 may begin receiving state data from the spectating device 234. In general, data received by the input agent 246 from the cloud-based service provider 216 is of a protocol that is not compatible with the game input driver 222. This input data is, in turn, translated to a protocol compatible with the game input driver 222 by various modules of the virtual input controller 250.

In one implementation, the input agent 246 receives data packets from the spectating device 234 and translates the data packets to a format acceptable by the virtual input injector 220. The virtual input injector 220, in turn, provides the translated data packets to the virtual device manager 240. The virtual device manager 240 performs a second translation to reformat these data packets according to a protocol that is recognized by the game input driver 222. As a result, the data packets received at the game input driver 222 from the driver-incompatible game controller 208 may be identical in format to data packets received from the driver-compatible game controller 206. The game input driver 222 processes these data packets and provides associated state data to the API of the gaming application 224 as if the data packets originated at a driver-compatible physical device.

Although the example of FIG. 2 is specific to a gaming device that broadcasts live game play and receives gaming inputs, the disclosed technology is also contemplated for use in input injection to non-gaming applications. For example, a computing device may broadcast a data stream generated by a non-gaming application for presentation on the spectating device 234, and the virtual input controller 250 may facilitate injection of inputs from the spectating device 234 into the non-gaming application. For example, the non-gaming application may be a 3D modeling program and the virtual controller 250 facilitates collaboration between multiple artists on a same modeling project. A variety of other implementations are also contemplated.

The disclosed technology may be useful in a variety of contexts. In one implementation, the cloud-based service provider 216 provides a spectator with the option of joining gameplay of the game application 224, such as by causing the gaming application 224 to add a new player (e.g., a new avatar) controlled by user inputs provided to the driver-incompatible game controller 208. For example, a user may choose to "try out" a gaming application from a web-based interface prior to purchasing and/or otherwise acquiring a local copy of the gaming application.

In another implementation, the cloud-based service provider 216 provides a spectator with the option of taking over control for a player currently controlling an avatar in the gaming application 224. For example, a user may provide inputs through the spectating device 234 help a player through a difficult part of the game. In yet another implementation, the disclosed technology allows different users spectating a same game broadcast to battle one another within the game via their respective spectating devices.

Figure 3:
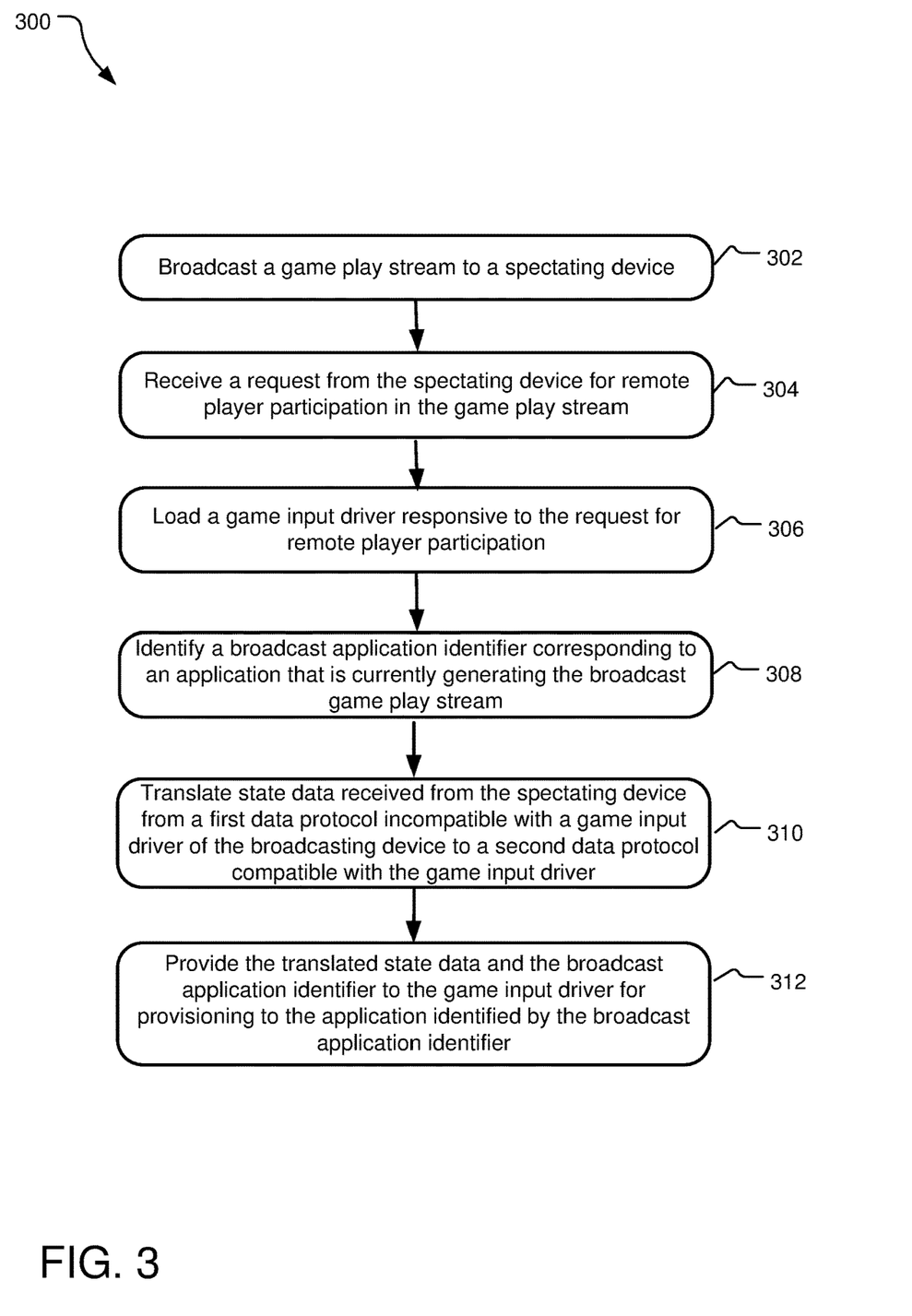
FIG. 3 illustrates example operations for virtual input injection that facilitate remote player participation in game play of a broadcast stream.

FIG. 3 illustrates example operations 300 for virtual controller injection to facilitate remote player participation in game play of a broadcast stream. A broadcasting operation 302 broadcasts the stream of game play from a broadcasting device (e.g., a device locally-executing the game) to one or more spectating devices. For example, a spectator may use a graphical user interface of a network-based video streaming system or service to select and view the broadcast stream, such as from multiple such streams available for viewing. In one implementation, the broadcast stream is a live stream.

A receiving operation 304 receives a transmission from the spectating device requesting remote player participation in the game play of the broadcast stream. For example, a user may initiate the request by selecting an option from a graphical user interface of a network-based video streaming service. In one implementation, a user requests to remotely join the game play of the broadcast stream by providing inputs to a game controller that is itself incompatible with a game input driver of the broadcasting device that is actively providing user inputs (e.g., state data and other information) to an API of the game. For example, the game controller may be a spectating device (e.g., a personal computer, tablet, mobile phone) or an accessory of a spectating device such as a keyboard, mouse, touchpad, joystick, wheel that is not configured to transmit data packets of a protocol recognized by the game input driver.

Responsive to receipt of the request for remote player participation, a virtual input controller creates a virtual device in memory that allows a loading operation 306 to load the game input driver on the broadcasting device. For example, the virtual device includes a device descriptor specifying a type of physical device known to be compatible with the game input driver. This device descriptor may be utilized by the operating system to identify and load applicable mini-drivers of a game input driver for communicating with the specified type of physical device.

Responsive to loading of a game input driver, one or more other actions (not shown) may be performed to prepare a game input driver to receive state data from the spectating device. For example, a unique ID may be requested from the game input driver and then provided back the input driver in an authentication sequence, such as described above with respect to FIG. 2, to create a handle to the virtual device that is usable to establish bidirectional communication between the game input driver and the game controller.

An identification operation 308 identifies a broadcast application identifier corresponding to an application that is currently generating a broadcast game play stream on the broadcast device.

A translation operation 310 translates state data (e.g., button presses) and other user input received from the spectating device from a first data protocol incompatible with the game input driver to a second data protocol compatible with the game input driver. If, for example, the broadcasting device is an Xbox console with a Game Input Protocol (GIP) driver for loading gaming applications, the translation operation 310 may translate the state data and other user inputs to a packet-format used and recognized by other GIP devices. In some implementations, translating the state data includes multiple translations steps through multiple layers of abstraction.

A providing operation 310 provides the translated state data and other user inputs to the game input driver in association with the virtual device and with the broadcast application identifier identified by the identification operation 308. For example, the providing operation 310 may instruct the game input driver to provide the translated state data to an application identified by the broadcast application identifier rather than an application that is merely "in-focus." As a result of this instruction, the game input driver does not inadvertently provide the translated state data to any other application regardless of which applications are currently executing on the broadcast device. Rather, the game input driver makes the input data available to an API of the application generating the broadcast game play stream (e.g., the application identified by the broadcast application identifier), and the state data from the spectating device is used to control gaming actions of the game.

Figure 4:
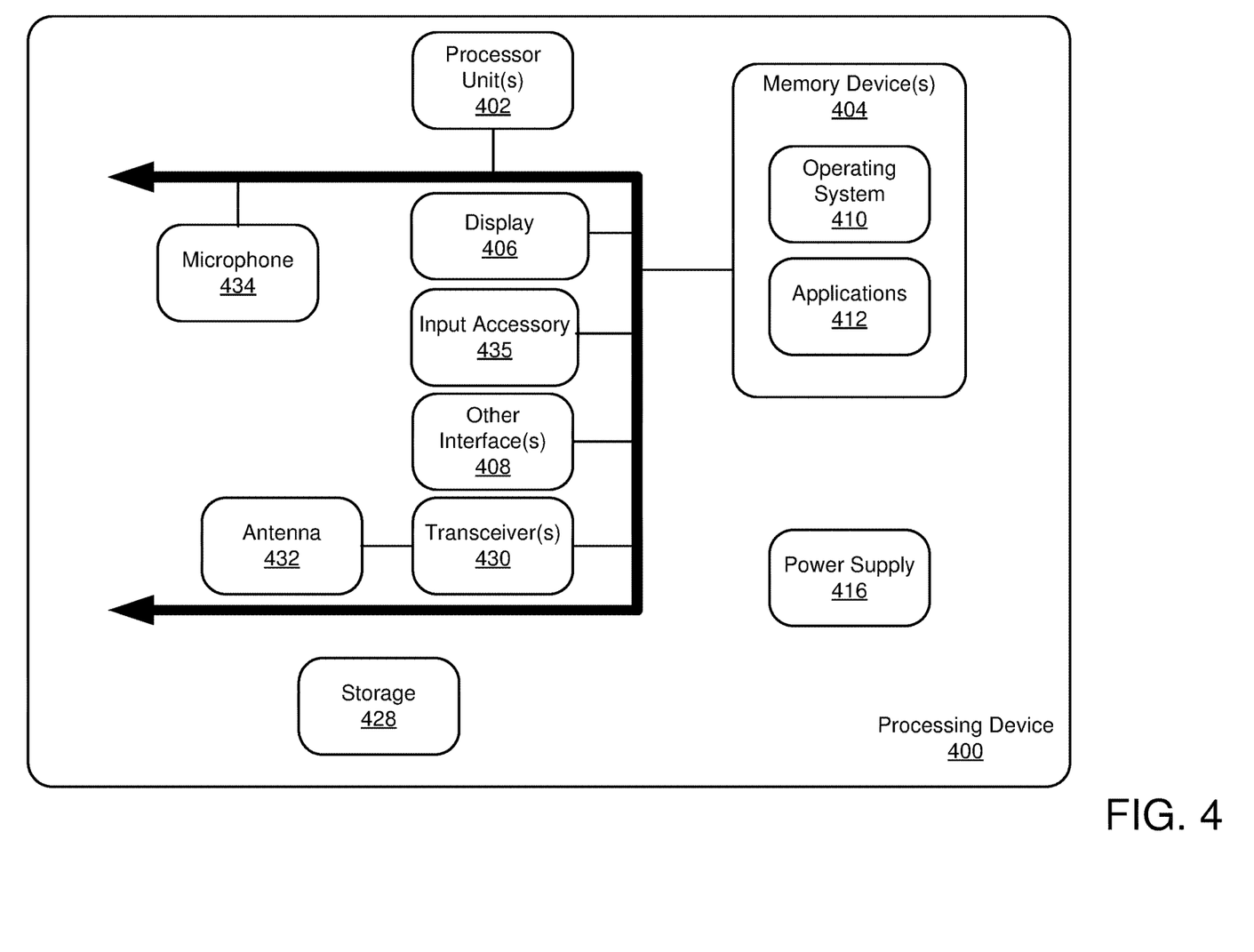
FIG. 4 illustrates an example schematic of a processing device suitable for implementing aspects of the disclosed technology.

FIG. 4 illustrates an example schematic of a processing device 400 suitable for implementing aspects of the disclosed technology. In various implementations, the processing device 400 may represent any one or more of a broadcasting device, spectating device, game controller, or game execution device. The processing device 400 includes one or more processor unit(s) 402, memory 404, a display 406, and other interfaces 408 (e.g., buttons). The memory 404 generally includes both volatile memory (e.g., RAM) and non-volatile memory (e.g., flash memory). An operating system 410, such as the Microsoft Windows® operating system, the Microsoft Windows® Phone operating system or a specific operating system designed for a gaming device, resides in the memory 404 and is executed by the processor unit(s) 402, although it should be understood that other operating systems may be employed.

One or more applications 412, are loaded in the memory 404 and executed on the operating system 410 by the processor unit(s) 402. The applications 412 may receive input from various input devices such as a microphone 434 or input accessory 435 (e.g., keypad, mouse, stylus, touchpad, gamepad, racing wheel, joystick). The processing device 400 includes a power supply 416, which is powered by one or more batteries or other power sources and which provides power to other components of the processing device 400. The power supply 416 may also be connected to an external power source that overrides or recharges the built-in batteries or other power sources.

The processing device 400 includes one or more communication transceivers 430 and an antenna 432 to provide network connectivity (e.g., a mobile phone network, Wi-Fi®, Bluetooth®). The processing device 400 may also include various other components, such as a positioning system (e.g., a global positioning satellite transceiver), one or more accelerometers, one or more cameras, an audio interface (e.g., a microphone 434, an audio amplifier and speaker and/or audio jack), and storage devices 428. Other configurations may also be employed.

In an example implementation, a mobile operating system, various applications (e.g., a gaming application) and other modules and services (e.g., a game input driver) may be embodied by instructions stored in memory 404 and/or storage devices 428 and processed by the processor unit(s) 402. The memory 404 may be memory of host device or of an accessory that couples to a host.

The processing device 400 may include a variety of tangible computer-readable storage media and intangible computer-readable communication signals. Tangible computer-readable storage can be embodied by any available media that can be accessed by the processing device 400 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example system disclosed herein includes a broadcasting agent configured to broadcast an application data stream generated by an application to a spectating device and an input driver configured to convey user inputs to an application programming interface (API) of the application. The system further includes a virtual input controller configured to translate state data received from the spectating device from a protocol incompatible with an input driver to a protocol compatible with the input driver; request a broadcast application identifier for a currently-broadcasting application from the broadcasting agent; and provide the translated state data to the input driver in association with the broadcast application identifier for affecting control actions to content within the broadcast application data stream.

In an example system of any preceding system, the virtual input controller is further configured to create a virtual device in the memory responsive to a request for remote participation from the spectating device.

In another example system of any preceding system, the virtual input controller uses a handle to the virtual device to transmit information from the input driver to the spectating device.

In yet another example system of any preceding system, the broadcasting agent is configured to initiate the broadcast of the application data stream responsive to a determination that a process identifier for a currently in-focus application corresponds to an application of a gaming type and to provide the process identifier to the virtual input controller responsive to the request for the broadcast application identifier.

In still another example system of any preceding system, the virtual input controller is further configured to load the input driver responsive to receipt of a request for remote participation.

In another example system of any preceding system, the virtual input controller is included within an operating system of a gaming console.

One or more tangible computer-readable storage media of a tangible article of manufacture encodes computer-executable instructions for executing on a computer system a computer process that comprises broadcasting an application data stream from a broadcasting device for presentation on a spectating device, wherein the broadcasting device includes an input driver configured to convey user inputs to an application programming interface (API) of an application generating the application data stream. The computer process further comprises translating state data received from the spectating device from a first data protocol incompatible with the input driver of the broadcasting device to a second data protocol compatible with the input driver of the broadcasting device; requesting a broadcast application identifier that identifies the application generating the broadcast application data stream; and providing the translated state data to the input driver in association with the broadcast application identifier for affecting control actions to content within the broadcast application data stream.

An example tangible computer-readable storage media encodes a computer process of any preceding computer process that further comprises loading the input driver of the broadcasting device responsive to receipt of a request for remote player participation from the spectating device.

An example tangible computer-readable storage media encodes a computer process of any preceding computer process that further comprises creating a virtual device in memory responsive to a request for remote participation from the spectating device.

Still another example tangible computer-readable storage media encodes a computer process of any preceding computer process that further comprises providing the spectating device with a handle to the virtual device.

Another example tangible computer-readable storage media encodes a computer process of any preceding computer process that further comprises loading the input driver based on characteristics of the virtual device.

In yet another example tangible computer-readable storage media that encodes a computer process of any preceding computer process, the broadcasting device is a gaming console and translating the state data is performed by an operating system of the gaming console.

In yet another example tangible computer-readable storage media that encodes a computer process of any preceding computer process, the application is a gaming application and the translated state data from the spectating device controls an avatar of a first player in a gaming application and state data from a driver-compatible game controller controls an avatar of a second player in the gaming application.

An example computing device includes a game input driver configured to receive first input data from a first game controller of a recognized data protocol and to provide the first input data to an API of a gaming application to control actions of a first player in the gaming application. The computing device further includes a virtual input controller configured to receive second input data from a second game controller, the second input data of a protocol incompatible with the game input driver; translate the second input data received to the recognized data protocol; request a broadcast application identifier for a currently-broadcasting application; and provide the translated input data to the game input driver in association with the broadcast application identifier for controlling actions of a second player via the API of the gaming application.

Another example computing device of any preceding computing device further comprises a broadcasting agent configured to initiate a broadcast of a game play stream responsive to a determination that a process identifier for a currently in-focus application corresponds to an application of a gaming type and provide the process identifier to the virtual input controller responsive to the request for the broadcast application identifier.

In another example computing device of any preceding computing device, the second input data includes a request for remote player participation and the virtual input controller is further executable to load the game input driver responsive to receipt of the request.

In still another example computing device of any preceding computing device, the computing device broadcasts a game play stream to a spectating device and the second game controller communicates with the virtual input controller through the spectating device.

In still another example computing device of any preceding computing device, the computing device locally executes the gaming application.

In still another example computing device of any preceding computing device, the virtual input controller is further configured to create a virtual device in memory responsive to a request for remote player participation from a spectating device.

In another example computing device of any preceding computing device, wherein the computing device is a gaming console and the game input driver and the virtual input controller are both included in an operating system of the gaming console.

An example system disclosed herein includes a means for broadcasting an application data stream generated by an application to a spectating device; a means for conveying user inputs to an application programming interface (API) of the application; a means for translating state data received from the spectating device from a protocol incompatible with an input driver to a protocol compatible with the input driver; a means for requesting a broadcast application identifier for a currently-broadcasting application from the broadcasting agent; and a means for providing the translated state data to the input driver in association with the broadcast application identifier for affecting control actions to content within the broadcast application data stream.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A broadcasting device comprising:
   a broadcasting agent stored in memory and executable by a processor to broadcast an application data stream to a spectating device, the application data stream being generated by an application that is locally-executing on the broadcasting device;
   an input driver stored in memory and executable by the processor to convey user inputs received from a locally-present controller to an application programming interface (API) of the application to affect first control actions to content within the broadcast application data stream; and
   a virtual input controller stored in memory and executable by the processor to:
     receive, during broadcast of the application data stream, a request from the spectating device for remote participation in the broadcast application data stream;
     translate state data received from the spectating device from a protocol incompatible with the input driver to a protocol compatible with the input driver;
     request a broadcast application identifier for a currently-broadcasting application from the broadcasting agent; and
     initialize a communication channel between the spectating device and the input driver using the broadcast application identifier obtained from the broadcasting agent; and
     provide the translated state data to the input driver along the initialized communication channel to affect second control actions to content within the broadcast application data stream, the state data being received, translated and provided to the input driver without executing a secondary instance of the application.

2. The broadcasting device of claim 1, wherein the virtual input controller is further configured to create a virtual device in the memory responsive to the request for remote participation from the spectating device.

3. The broadcasting device of claim 2, wherein the virtual input controller uses a handle to the virtual device to transmit information from the input driver to the spectating device.

4. The broadcasting device of claim 1, wherein the broadcasting agent is configured to:
   initiate the broadcast of the application data stream responsive to a determination that a process identifier for a currently in-focus application corresponds to an application of a gaming type; and
   provide the process identifier to the virtual input controller responsive to the request for the broadcast application identifier.

5. The broadcasting device of claim 1, wherein virtual input controller is further configured to load the input driver responsive to receipt of the request for remote participation.

6. The broadcasting device of claim 1, wherein the virtual input controller is included within an operating system of a gaming console and wherein the spectating device is a personal computer.

7. The broadcasting device of claim 1, wherein the virtual input controller is further executable to:
   create a virtual device responsive to receipt of the request for remote participation from the spectating device, the virtual device having a device descriptor that the input driver recognizes as identifying a device type compatible with the input driver, wherein the communication channel is initialized between the input driver and the spectating device and the virtual device is configured to transmit the translated state data to the input driver along the initialized communication channel to affect the control actions to content within the broadcast application data stream.

8. One or more non-transitory computer-readable storage media encoding computer-executable instructions for executing on a computer system a computer process, the computer process comprising:
   broadcasting an application data stream from a broadcasting device for presentation on a spectating device, the broadcasting device locally-executing an application generating the application data stream and including an input driver configured to convey user inputs received from a locally-present controller to an application programming interface (API) of the application to affect first control actions to content within the broadcast application data stream;
   receiving, during broadcast of the application data stream, a request from the spectating device for remote participation in the broadcast application data stream;
   translating state data received from the spectating device from a first data protocol incompatible with the input driver of the broadcasting device to a second data protocol compatible with the input driver of the broadcasting device;
   requesting, during the broadcast of the application data stream, a broadcast application identifier that identifies the application generating the broadcast application data stream;
   initializing a communication channel between the spectating device and the input driver using the broadcast application identifier; and
   providing the translated state data to the input driver along the initialized communication channel to affect second control actions to content within the broadcast application data stream, the state data being received, translated, and provided to the input driver without executing a secondary instance of the application.

9. The one or more non-transitory computer readable storage media of claim 8, wherein the computer process further comprises:
   loading the input driver of the broadcasting device responsive to receipt of the request for remote participation from the spectating device.

10. The one or more non-transitory computer readable storage media of claim 9, wherein providing the translated state data to the input driver further comprises providing the spectating device with a handle to a virtual device having a device descriptor that the input driver recognizes as identifying a device type compatible with the input driver.

11. The one or more non-transitory computer readable storage media of claim 10, wherein the computer process further comprises:
   loading the input driver based on characteristics of the virtual device.

12. The one or more non-transitory computer readable storage media of claim 8 wherein the broadcasting device is a gaming console and translating the state data is performed by an operating system of the gaming console.

13. The one or more non-transitory computer readable storage media of claim 8, wherein the application is a gaming application and the translated state data from the spectating device controls an avatar of a first player in the gaming application and state data from a driver-compatible game controller controls an avatar of a second player in the gaming application.

14. The one or more non-transitory computer readable storage media of claim 8, wherein the computer process further comprises:
   creating a virtual device responsive to receipt of the request for remote participation from the spectating device, the virtual device having a device descriptor that the input driver recognizes as identifying a device type compatible with the input driver, wherein the communication channel is initialized between the input driver and the spectating device and the virtual device is configured to transmit the translated state data to the input driver along the initialized communication channel to affect the control actions to content within the broadcast application data stream.

15. A computing device comprising:
   a game input driver stored in memory and executable by a processor to receive first input data from a locally-present first game controller of a recognized data protocol and provide the first input data to an API of a gaming application to control actions of a first player in the gaming application;
   a virtual input controller stored in the memory and executable by the processor to:
      receive, during broadcast of a gameplay stream, second input data from a second game controller, the second input data including a request for remote participation in the gameplay stream;
      translate the second input data received to the recognized data protocol;
      request, during the broadcast of the gameplay stream, a broadcast application identifier for a currently-broadcasting application;
      initialize a communication channel between the second game controller and the game input driver using the broadcast application identifier; and
      provide the translated second input data to the game input driver, along the initialized communication channel for controlling actions of a second player in the gameplay stream via the API of the gaming application, the second input data being received, translated, and provided to the game input driver without executing a secondary instance of the application.

16. The computing device of claim 15, further comprising a broadcasting agent configured to:
  initiate a broadcast of a game play stream responsive to a determination that a process identifier for a currently in-focus application corresponds to an application of a gaming type; and
  provide the process identifier to the virtual input controller responsive to the request for the broadcast application identifier.

17. The computing device of claim 15, wherein the second input data includes a request for remote player participation and the virtual input controller is further executable to load the game input driver responsive to receipt of the request.

18. The computing device of claim 15, wherein the computing device broadcasts a game play stream to a spectating device and the second game controller communicates with the virtual input controller through the spectating device.

19. The computing device of claim 15, wherein the computing device locally executes the gaming application.

20. The computing device of claim 15, wherein the computing device is a gaming console and the game input driver and the virtual input controller are both included in an operating system of the gaming console.

* * * * *